United States Patent Office 2,992,091
Patented July 11, 1961

2,992,091
METHOD OF CONTROLLING UNDESIRABLE VEGETATION
Marion W. Harman and John J. D'Amico, Nitro, W. Va., assignors to Monsanto Chemical Company, St. Louis, Mo., a corporation of Delaware
No Drawing. Filed May 6, 1957, Ser. No. 657,051
25 Claims. (Cl. 71—2.6)

This invention relates to methods of destroying or controlling vegetation and to herbicidal compositions. More particularly it relates to methods of destroying or controlling vegetation which comprises applying thereto a toxic concentration of a benzyl ester of a thiocarbamic acid containing the nucleus

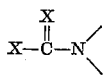

where X is a chalkogen of atomic weight less than 40 at least one of which is sulfur.

General objects of the invention are to provide compositions which are toxic to living plants and to provide methods for their use to accomplish various desirable ends. A further general object is to provide compositions and methods for the destruction of noxious vegetation. Another object is to destroy noxious vegetation either in the form of germinating seeds or by application of the toxicant to the foliage after emergence. Another object is to provide a method for controlling broadleaved plants. A further object is to provide new compounds which are outstandingly effective herbicides and to provide methods for preparing them. A particular object of the invention is to provide toxicants which combine a hormonelike action on broadleaved plants and severe phytotoxicity to grasses.

A method of destroying or controlling undesired vegetation, according to this invention, comprises applying thereto a toxic concentration of a phytotoxic benzyl ester of a thiocarbamic acid containing the nucleus

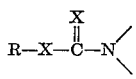

where X represents oxygen or sulfur at least one of which is sulfur and R represents benzyl, preferably halobenzyl, the number of halogen atoms being less than five. The halogen substituents are preferably chlorine but bromine and to a lesser extent fluorine and iodine are also suitable.

The acyclic esters of thiocarbamic acids comprise grass specific herbicides but the benzyl esters are toxic to broadleaved plants. Certain benzyl thiocarbamates possessing structural characteristics hereinafter elucidated combine toxicity to both grass and broadleaves. Methyl substituted benzyl esters as for example p-methylbenzyl, o-methylbenzyl, 2,4-dimethylbenzyl and 2,6-dimethylbenzyl are also suitable.

The valences on the nitrogen are satisfied by hydrogen or organic radicals but not more than one aromatic radical may be linked directly to the nitrogen and then the other radical is desirably an acyclic hydrocarbon of two or three carbon atoms. Divalent radicals forming with the nitrogen a closed heterocyclic ring are also contemplated. Examples of amino radicals linked to the

group are the radicals derived by removal of the hydrogen from the nitrogen of pyrrolidine, piperidine, 5-ethyl-2-methyl piperidine, morpholine, diethylamine, diisopropylamine and dibutylamine. It is preferred that both of the remaining nitrogen valences in the

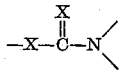

nucleus are linked to carbon atoms.

The position of halogen is a significant variable. The compounds containing halogen in the 2- and 6-positions are outstanding. There may be a synergistic action from mixtures because the compositions from crude chlorination products have in general been equal or superior to any pure component known to be present.

The phytotoxic benzyl dithiocarbamates comprise weed killers having both pre-emergence and post-emergence activity. Accordingly, by applying the toxicant to the plant is meant any means whereby it is brought into contact with living plants which latter include germinating seedlings, as for example by application to the ground before the plants emerge or by direct application to the foliage.

The new toxicants may be applied conveniently in the form of a spray containing the active ingredient in a concentration within the range of 0.1–10.0% by weight. Thorough coverage of the foliage is effective for contact killing. For pre-emergence control of plants amounts within the range of ¼ to 100 pounds per acre may be used and within the range of 30–100 pounds the compounds effect soil sterilization. Examples of grasses which are controlled are foxtail, giant foxtail, annual blue grass, cheat grass, wild oats, rye grass and crab grass. Weeds from the following plant families are controlled to varying degrees: Leguminosae, Cucurbitaceae, Umbelliferae, Chenopodiaceae, Amaranthaceae, Convolvulaceae and Aizoaceae.

Although most of the esters are insoluble in water, they are soluble in common organic solvents. Most of them are soluble in acetone, chloroform, ethyl alcohol, ethyl acetate, benzene, ether and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. If the latter it is convenient to incorporate a wetting or dispersing aid into the formulation.

The benzyl thiocarbamates exert formative effects like those commonly associated with the chlorophenoxyacetic acids. Herbicidal activity on foliage contact particularly against broadleaved plants is illustrated by the data recorded in Table I. It is believed that the acid component contributes toxicity to grasses and that the ester radical contributes the toxicity to broadleaves but the invention is not limited to any theory of the operation. A spray containing the concentration of the active ingredient shown in the table was applied to the foliage of grasses, to the foliage of bean plants and to the foliage of a mixture of broadleaved plants. The mixture is indicated in the table as "Broadleaf." A rating of 0 indicates no phytotoxicity, 1 slight, 2 moderate and 3 severe phytotoxicity.

The compounds designated ar,ar,ar-trichlorobenzyl esters were derived from reaction of an alkali metal thiocarbamate with chlorobenzyl chloride prepared by chlorinating toluene in the ring in the presence of iron until the gain in weight corresponded to that calculated for trichlorotoluene and then removing the iron and chlorinating the side chain until the gain in weight corresponded to that calculated for trichlorobenzyl chloride.

*Table I*

| Active Ingredient | Conc., percent | Phytotoxicity Rating | | |
|---|---|---|---|---|
| | | Grass | Bean | Broadleaf |
| Benzyl dimethyldithiocarbamate | 1.0 | 3 | | 3+ |
| ar,ar,ar-Trichlorobenzyl dimethyldithiocarbamate | 0.05 | 1 | 1 | 1 |
| ar,ar,ar-Trichlorobenzyl diethyldithiocarbamate | 0.5 | 1 | 3 | 2+ |
| ar,ar,ar-Trichlorobenzyl diethylthiolcarbamate | 0.5 | 3 | 3 | 3 |
| ar,ar,ar-Trichlorobenzyl diisopropyldithiocarbamate | 0.5 | 1+ | 2+ | 2+ |
| | 0.1 | 2 | 2 | 3 |
| ar,ar,ar-Trichlorobenzyl diisobutyldithiocarbamate | 0.5 | 0 | 1 | 2+ |
| ar,ar,ar-Trichlorobenzyl dipentyldithiocarbamate | 0.5 | 1 | 1 | 2 |
| ar,ar,ar-Trichlorobenzyl bis-(2-methoxyethyl)dithiocarbamate | 0.5 | 1 | 3 | 3 |
| ar,ar,ar-Trichlorobenzyl N-allyl-isopropyldithiocarbamate | 0.5 | 1 | 2+ | 2 |
| ar,ar,ar-Trichlorobenzyl diallyldithiocarbamate | 0.5 | 2 | 3 | 3 |
| ar,ar,ar-Trichlorobenzyl N-(2-carbamoylethyl)cyclohexyldithiocarbamate | 0.5 | 0 | 1 | 2+ |
| ar,ar,ar-Trichlorobenzyl N-(2-chloroallyl)isopropyldithiocarbamate | 0.5 | 1+ | 3 | 3 |
| | 0.5 | 1+ | 3+ | 2+ |
| p-Chlorobenzyl diisopropyl-dithiocarbamate | 0.2 | 2 | 2 | 2+ |
| | 0.05 | 1+ | 1+ | 1+ |
| o-Chlorobenzyl diisopropyl-dithiocarbamate | 0.5 | 2+ | 2+ | 2+ |
| | 0.2 | 1 | 0 | 2 |

*Table I—Continued*

| Active Ingredient | Conc., percent | Phytotoxicity Rating | | |
|---|---|---|---|---|
| | | Grass | Bean | Broadleaf |
| 2,4-Dichlorobenzyl diisopropyl-dithiocarbamate | 0.5 | 3 | | 3 |
| | 0.2 | 2 | 1+ | 2 |
| 3,4-Dichlorobenzyl diisopropyl-dithiocarbamate | 0.5 | 3 | 3 | 2 |
| 2,6-Dichlorobenzyl diisopropyl-dithiocarbamate | 0.5 | 2 | 1 | 3 |
| | 0.2 | 1+ | | 2 |
| ar,ar,ar-Trichlorobenzyl dithiocarbamate | 0.5 | 2 | 3 | 2 |
| 2,4,5-Trichlorobenzyl diisopropyl-dithiocarbamate | 0.5 | 2+ | 1+ | 2+ |
| | 0.2 | 2 | 1 | 1+ |
| 2,4,6-Trichlorobenzyl diisopropyl-dithiocarbamate | 0.5 | 1 | 1+ | 2+ |
| ar,ar,ar-Trichlorobenzyl morpholine-carbodithioate | 0.5 | 1+ | 2 | 2+ |
| 2,3,6-Trichlorobenzyl diisopropyldithiocarbamate | 0.5 | 2+ | 2+ | 3+ |
| | 0.2 | 2+ | | 3 |
| O-Sodium salt of ar,ar,ar-trichlorobenzyl N-(carboxymethyl)-methyldithiocarbamate, dihydrate | 0.5 | 1 | 3 | 3+ |
| O-Sodium salt of 2,3,6-trichlorobenzyl N-(carboxymethyl)-methyldithiocarbamate, dihydrate | 0.5 | 1 | 2+ | 3+ |

The data recorded in Table II demonstrate pre-emergence activity. In these tests the spray was applied to the ground of seeded plots before any plants emerged. The plants studied included most of the following in each test: wild oat, cheat grass, rye grass (dom.), buckwheat, mustard (radish), red clover, beet-sugar, cucumber, cotton, corn, foxtail, portulaca, brome grass, barnyard grass, crab grass, field bindweed, Russian thistle, pigweed and wild morning glory. The quantity of the benzyl ester applied per acre is recorded together with the phytotoxicity observed.

*Table II*

| Active Ingredient | Lbs./Acre | Results Observed |
|---|---|---|
| Benzyl dimethyldithiocarbamate | 50 | Severe phytotoxicity wild oats, cheat grass, mustard and rye grass; moderate phytotoxicity to beet. |
| ar,ar,ar-Trichlorobenzyl diethyldithiocarbamate | 5 | Mustard, clover, sugar-beet abnormal, slight formative effect. Severe formative effect on cucumber. |
| ar,ar,ar-Trichlorobenzyl diisopropyldithiocarbamate | 25, 10, 5, 2.5, 1 | All broadleaf plants show severe formative effects at all rates down to 1 lb./acre. All grasses severely injured at 25 lbs. and 10 lbs./acre and to a lesser degree at decreasing rates. |
| 2,4,5-Trichlorobenzyl diisopropyldithiocarbamate | 25 | Slight formative action. |
| ar,ar,ar-Trichlorobenzyl morpholinecarbodithioate | 25 | Severe formative effects on all broadleaf plants. |
| ar,ar,ar-Trichlorobenzyl dithiocarbamate | 25 | Formative effects. Severe phytotoxicity sugar beet and pigweed; moderate phytotoxicity morning glory, mustard and field bindweed. |
| p-Chlorobenzyl diisopropyldithiocarbamate | 25, 10, 5 | Formative action at all rates; wild oats, rye grass, clover, and beet abnormal and stunted. All grasses abnormal. No crab grass survived at 25 lbs./acre. |
| 2,4-Dichlorobenzyl diisopropyldithiocarbamate | 25, 10, 5 | Formative action. Wild oats, rye and foxtail abnormal and all broadleaved plants stunted at all rates. Foxtail destroyed at all rates. |
| o-Chlorobenzyl diisopropyldithiocarbamate | 5 | Formative action. Wild oats, rye, buckwheat, clover, cucumber abnormal. Complete control of foxtail. |
| ar,ar,ar-Trichlorobenzyl bis-(2-methoxyethyl)dithiocarbamate | 25 | Severe formative action on all broadleaved plants. |
| ar,ar,ar-Trichlorobenzyl N-allylisopropyldithiocarbamate | 25 | Slight formative action on all plants. |
| ar,ar,ar-Trichlorobenzyl diallyldithiocarbamate | 25 | Severe formative action on all broadleaved plants. |
| ar,ar,ar-Trichlorobenzyl dipentyldithiocarbamate | 25 | Slight formative action on all plants. |
| ar,ar,ar-Trichlorobenzyl N-(2-carbamoylethyl)cyclohexyldithiocarbamate | 25 | Slight formative action on broadleaved plants. |
| ar,ar,ar-Trichlorobenzyl N-(2-chloroallyl)isopropyldithiocarbamate | 25 | Buckwheat, radish, clover, beet, cotton and cucumber all abnormal. |
| 2,6-Dichlorobenzyl diisopropyldithiocarbamate | 5, 1 | Formative action. Wild oat, barnyard grass, crab grass and pigweed very abnormal. Crab grass and beet abnormal, pigweed dying. Severe phytotoxicity to wild oat, foxtail, barnyard grass, mustard, beet and pigweed. |
| 2,3,6-Trichlorobenzyl diisopropyldithiocarbamate | 5, 1 | Formative action. Wild oats, foxtail, crab grass, bindweed and pigweed abnormal. Foxtail and crab grass abnormal pigweed dying. Severe phytotoxicity to wild oat, foxtail and barnyard grass. |
| 2,4,6-Trichlorobenzyl diisopropyldithiocarbamate | 5, 25 | Formative action. Wild oats, foxtail and pigweed abnormal. Formative action evident on broadleaves, foxtail, crab grass and cotton abnormal. |
| ar,ar,ar-Trichlorobenzyl diethylthiolcarbamate | 1 | Slight formative action. Severely phytotoxic to foxtail, crab grass and pigweed. |
| O-Sodium salt of ar,ar,ar-trichlorobenzyl N-(carboxymethyl)methyldithiocarbamate, dihydrate | 25 | Slight formative action on broadleaved plants. |
| O-Sodium salt of 2,3,6-trichlorobenzyl N-(carboxymethyl)methyldithiocarbamate, dihydrate | 25 | Moderately severe formative action on all broadleaved plants |

Ar,ar,ar-trichlorobenzyl diisopropyldithiocarbamate is slowly lethal at rates as low as 2.5 pounds/acre.

Tests were designed to measure the yield increase due to the herbicide and to determining whether the herbicide injured the crop. The individual figures in Table III are the average of the replicates indicated. The tests were run on corn, one series of treated plots being hand weeded so that weed competition was not a factor. These hand weeded plots showed no significant deviation from the hand weeded check. The tractor cultivated plots and the hand weeded plots were adjacent to each other so as to be directly comparable. The difference is a measure of the yield decrease due to weed competition. The difference between these decreases and that of the untreated check is the net increase due to the herbicide. The weight of weeds present at harvest given in the last column indicates the degree of weed control. The yield increase in the hand weeded plots at 8 and 16 pound rates which produced perfect weed control may be due to better aeration from hoeing around the plants. The data in Table III were obtained using ar,ar,ar-trichlorobenzyl diisopropyldithiocarbamate.

Attapulgus clay. The resulting ar,ar,ar-trichlorobenzyl diisopropyldithiocarbamate was a viscous oil obtained in 77.7% theory yield.

For the preparation of halogenated benzyl halides other catalysts than light and other chlorinating agents than elemental chlorine are suitable. A compound having similar properties results from $SO_2Cl_2$ chlorination of trichlorotoluene in the presence of peroxide. Distillation of the crude product yielded a fraction B.P. 106–108° C./2 mm. which gave a solid ester. The trichlorobenzyl diisopropyldithiocarbamate from this fraction melted at 71–73° C. after recrystallizing from heptane. It exhibited no advantage over the composition prepared from undistilled trichlorobenzyl chloride.

Ar,ar,ar - trichlorobenzyl dipropylthiolcarbamate was prepared as follows: A solution comprising 202.4 grams (2.0 moles) of di-n-propylamine and 500 ml. of dry ethyl ether was cooled to —10° C. and 120 grams (2.0 moles) of carbon oxysulfide bubbled in at —10 to 0° C. over a 30 minute period or until a gain in weight of 120 grams. The reaction mixture was stirred at 0–10° C. for 1.5 hours and then 230 grams (1.0 mole) of ar,ar,ar-trichloro-

*Table III*

| Rate, Lbs./Acre | No. of Replications | Hand Weeded Plots, Bu./Acre | Tractor Cultivated Plots, Bu./Acre | Yield Decrease Due to Weeds, Bu./Acre | Yield Increase Due to Chemical, Bu./Acre | Average Wt. of Weeds Harvested Per Plot, Lbs. |
|---|---|---|---|---|---|---|
| 16 | 3 | 99 | 89 | 10 | 26 | 0 |
| 8 | 3 | 107 | 86 | 21 | 15 | 0 |
| 4 | 3 | 106 | 89 | 17 | 19 | 2.8 |
| None-check | 12 | 104 | 68 | 36 | | 8.2 |

The halogenated benzyl esters of this invention may be prepared by condensing a halogenated benzyl alcohol with a thiocarbamyl halide to yield a thionocarbamate and by condensing a halogenated benzyl halide with a salt of a dithio- or thiol-carbamic acid. A trichlorobenzyl chloride suitable for preparation of the preferred composite product may be prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultravoilet light until the gain in weight was that calculated for trichlorobenzyl chloride. Analysis of the product for chlorine at this point gave 61.8%.

Condensation with sodium diisopropyldithiocarbamate was effected as follows: A solution comprising 202.4 grams (2.0 moles) of diisopropylamine, 320.0 grams (2.0 moles) of 25% sodium hydroxide and 1610 grams of water was cooled to 10° C. and 152.0 grams (2.0 moles) of carbon disulfide added over a 30 minute period with a slight temperature rise (5–10° C.). The reaction mixture was stirred for an additional 30 minutes and 460.0 grams (2.0 moles) of trichlorobenzyl chloride added in one portion, a slight temperature rise again being noted. The reaction mixture was then heated to 50–60° C. for 3 hours, cooled to 25° C., the water layer separated and discarded. The product layer was washed with several 200 cc. water washes, vacuum treated for 1.5 hours at 70–80° C. under 5–10 mm. pressure and filtered through benzyl chloride added in one portion. The mixture was maintained at 25–30° C. for 24 hours, filtered to remove the amine hydrochloride and the ether removed in vacuo. Unreacted ar,ar,ar-trichlorobenzyl chloride was removed by heating at 1–2 mm. at a maximum temperature of 150–200° C. and the product filtered to remove a small amounts of impurities. A dark amber viscous oil was obtained in 82.7% theory yield. Analysis gave 3.23% nitrogen and 9.57% sulfur as compared to 3.95% nitrogen and 9.04% sulfur calculated for $C_{13}H_{18}Cl_3NOS$.

Substituting diisopropylamine in the foregoing procedure yielded ar,ar,ar-trichlorobenzyl diisopropylthiolcarbamate as a viscous amber oil.

Although some of the halobenzyl chlorides are new compounds, they may be prepared by well known principles of organic chemistry. α-2,4,5-tetrachlorotoluene was prepared by the chlorination of 2,4,5-trichlorotoluene. 1.1 grams of benzoyl peroxide was added to 237 grams of 2,4,5-trichlorotoluene M.P. 82.5° C. dissolved in 250 ml. of carbon tetrachloride. There was then added 164 grams of sulfuryl chloride. The solution was heated up very slowly over a period of about 3 hours to 77° C. and then kept at refluxing temperature (77° C.) for a period of 4 hours. The solvent and sulfuryl chloride were removed by distillation and the residue distilled in vacuo and then fractionated. α-2,4,5-tetrachlorotoluene was obtained as a colorless liquid with a boiling point of 102–104° C. at 2 mm. Hg. Condensation with sodium diisopropyldithiocarbamate yielded 2,4,5-trichlorobenzyl diiospropyldithiocarbamate in 98.5% yield. The product was a solid, M.P. 53–54° C., analyzing 3.80% nitrogen, 17.14% sulfur and 28.73% chlorine as compared to 3.78% nitrogen, 17.29% sulfur and 28.69% chlorine calculated for $C_8H_{16}Cl_3NS_2$.

α-2,4,6-tetrachlorotoluene was prepared by adding chlorine to 723 grams of 2,4,6-trichlorotoluene M.P. 33–34° C. The trichlorotoluene was placed in a flask equipped with a stirrer, condenser, thermometer and a bubbler tube and heated to 90° C. at which temperature 132 grams of chlorine were added over a 2½ hour period.

It was necessary to supply a small amount of heat to hold the temperature between 190–198° C. during chlorination. The product was then fractionated and α-2,4,6-tetrachlorotoluene collected as a colorless liquid, boiling point 123–126° C. at 8 mm. Hg. Condensation with sodium diisopropyldithiocarbamate yielded 2,4,6-trichlorobenzyl diisopropyldithiocarbamate in 77.5% yield. After recrystallization from ethyl alcohol the product melted at 129–130° C. Analysis gave 3.69% nitrogen, 17.28% sulfur and 28.99% chlorine as compared to 3.78% nitrogen, 17.29% sulfur and 28.69% chlorine calculated for $C_8H_{16}Cl_3NS_2$.

In a similar manner, α-2,3,6-tetrachlorotoluene was prepared by introducing 98 grams of chlorine into 546 grams of 2,3,6-trichlorotoluene M.P. 41–42° C. at a temperature of 190–198° C. The product was collected as a colorless liquid by fractional distillation M.P. 132–135° C. at 10 mm. Hg. Condensation with sodium diisopropyldithiocarbamate produced 2,3,6-trichlorobenzyl diisopropyldithiocarbamate in 79.5% yield. The product was a solid M.P. 82–83° C. after recrystallization from heptane. Analysis gave 3.74% nitrogen, 17.23% sulfur and 28.92% chlorine as compared to 3.78% nitrogen, 17.29% sulfur and 28.69% chlorine calculated for $C_8H_{16}Cl_3NS_2$.

α-2,3,4-tetrachlorotoluene was prepared by light catalyzed chlorination of 2,3,4-trichlorotoluene. 283 grams of the trichlorotoluene was heated to 180° C. and then with a sunlamp placed 8 to 10 inches from the pot, 50 grams of chlorine added over 40 minutes at 180 to 200° C. The product was distilled in vacuo to yield α-2,3,4-tetrachlorotoluene as a colorless liquid B.P. 137–142° C. at 10 mm. Hg. Condensing with sodium diisopropyldithiocarbamate gave a 90.2% yield of 2,3,4-trichlorobenzyl diisopropyldithiocarbamate, a viscous oil.

α-2,5-trichlorotoluene was prepared by light catalyzed chlorination of 2,5-dichlorotoluene in a manner similar to that described. The desired product was isolated by fractional distillation as a colorless liquid, B.P. 132–136° C. at 25 mm. Hg. 2,5-dichlorobenzyl diisopropyldithiocarbamate formed in 78.7% yield upon condensing with sodium diisopropyldithiocarbamate. It was a viscous oil analyzing 3.82% nitrogen as compared to a calculated value of 4.11%.

The physical properties of some of the phytotoxic halobenzyl esters are set forth below. The physical properties unless otherwise indicated are those of unpurified products. All yields reported are of unpurified products.

Table IV

| Structural Formula | Analysis | | M.P., °C. | Yield, percent |
|---|---|---|---|---|
| | Calcd., percent | Found, percent | | |
| p-Chlorobenzyl diisopropyldithiocarbamate 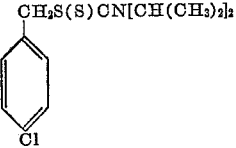 | N 4.65 S 21.24 | 4.45 20.6 | 84–85 [1] | 96.3 |
| 2,4-Dichlorobenzyl diisopropyldithiocarbamate 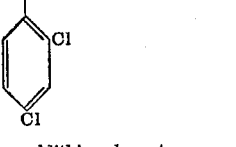 | N 4.16 | 3.78 | amber oil | 80.9 |
| o-Chlorobenzyl diisopropyldithiocarbamate 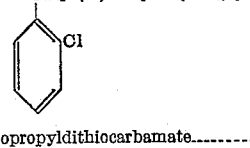 | N 4.65 | 4.39 | ......do............... | 83.0 |
| m-Chlorobenzyl diisopropyldithiocarbamate 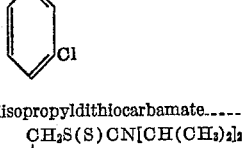 | N 4.65 | 3.97 | viscous oil | 89.5 |
| 3,4-Dichlorobenzyl diisopropyldithiocarbamate 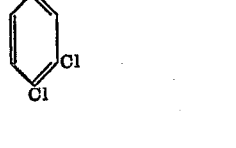 | N 4.16 Cl 21.08 | 3.80 21.51 | 59–61 | 96.0 |

Table IV—Continued

| Structural Formula | Analysis | | M.P., ° . | Yield, percent |
|---|---|---|---|---|
| | Calcd., percent | Found, percent | | |
| ar,ar,ar-Trichlorobenzyl diisobutyldithiocarbamate<br>$CH_2S(S)CN[CH_2CH(CH_3)_2]_2$<br>$\bigcirc$—$Cl_3$ | N | 3.49 | 3.13 | dark amber liquid | 75.0 |
| ar,ar,ar-Trichlorobenzyl bis(2-methoxyethyl)-dithiocarbamate<br>$CH_2S(S)CN(CH_2CH_2OCH_3)_2$<br>$\bigcirc$—$Cl_3$ | N | 3.48 | 3.59 | amber oil | 71.7 |
| ar,ar,ar-Trichlorobenzyl N-allyl-isopropyldithiocarbamate<br>$CH_2S(S)CNCH(CH_3)_2$<br>$\quad\quad CH_2CH=CH_2$<br>$\bigcirc$—$Cl_3$ | N | 3.79 | 3.20 | ......do............. | 76.0 |
| ar,ar,ar-Trichlorobenzyl diallyldithiocarbamate<br>$CH_2S(S)CN(CH_2CH=CH_2)_2$<br>$\bigcirc$—$Cl_3$ | N | 3.82 | 3.11 | viscous amber oil | 73.2 |
| ar,ar,ar-Trichlorobenzyl dipentyldithiocarbamate<br>$CH_2S(S)CN(C_5H_{11})_2$<br>$\bigcirc$—$Cl_3$ | N | 3.28 | 3.17 | ......do............. | 66.5 |
| ar,ar,ar-Trichlorobenzyl N-(3-chloro-2-butenyl)cyclohexyldithiocarbamate<br>$\quad\quad\quad H\ H$<br>$\quad\quad\quad C-C=C-CH_3$<br>$\quad\quad\quad H\quad\quad Cl$<br>$CH_2S(S)CN$<br>$\quad\quad\quad C_6H_{11}$<br>$\bigcirc$—$Cl_3$ | N<br>S<br>Cl | 3.04<br>14.02<br>30.91 | 3.05<br>13.81<br>31.80 | }viscous oil | 90.0 |
| ar,ar,ar-Trichlorobenzyl N-(2-carbamoylethyl)cyclohexyldithiocarbamate<br>$CHS_2(S)CNC_6H$<br>$\quad\quad\quad CH_2CH_2CONH_2$<br>$\bigcirc$—$Cl_3$ | N | 6.35 | 6.15 | 111:113 [2] | 70.0 |
| ar,ar,ar-Trichlorobenzyl N-(2-chloroallyl)isopropyldithiocarbamate<br>$CH_2S(S)CNCH(CH_3)C$<br>$\quad\quad\quad CH_2CCl=CH_2$<br>$\bigcirc$—$Cl_3$ | N | 3.47 | 3.22 | viscous oil | 79.5 |
| ar,ar,ar-Trichlorobenzyl diethylthiocarbamate<br>$CH_2S(O)CN(C_2H_5)_2$<br>$\bigcirc$—$Cl_3$ | N | 4.29 | 3.71 | yellow liquid | 71.0 |

Table IV—Continued

| Structural Formula | Analysis | | M.P., °C. | Yield, percent |
| --- | --- | --- | --- | --- |
| | Calcd., percent | Found, percent | | |
| 2,6-Dichlorobenzyl diisopropyldithiocarbamate<br>$CH_2S(S)CN[CH(CH_3)_2]_2$ on 2,6-dichlorophenyl ring | N 4.16<br>S 19.07<br>Cl 21.08 | 4.16<br>18.63<br>20.90 | 100–101 [2] | 83.5 |
| O-Sodium salt of 2,3,6-trichlorobenzyl N-(carboxymethyl)methyldithiocarbamate, dihydrate.<br>$CH_2S(S)CN-CH_2COONa \cdot 2H_2O$, $CH_3$ on 2,3,6-trichlorophenyl ring | N | 3.36 | 3.22 | 242–245 [2] | 53.4 |
| ar,ar,ar-Trichlorobenzyl diisobutylthiolcarbamate<br>$CH_2S(O)CN[CH_2CH(CH_3)_2]_2$ on $Cl_3$-phenyl ring | N | 3.66 | 3.27 | viscous amber oil | 82.0 |
| ar,ar,ar-Trichlorobenzyl dithiocarbamate<br>$CH_2S(S)CNH_2$ on $Cl_3$-phenyl ring | N | 4.89 | 4.47 | 126–134 | 36.8 |
| O-Sodium salt of ar,ar,ar-trichlorobenzyl N-(carboxymethyl)methyldithiocarbamate, dihydrate.<br>$CH_2S(S)CN-CH_2COONa \cdot 2H_2O$, $CH_3$ on $Cl_3$-phenyl ring | | | | 70–80 | 30.6 |
| ar,ar,ar-Trichlorobenzyl N-(carboxymethyl)methyldithiocarbamate<br>$CH_2S(S)CN-CH_2COOH$, $CH_3$ on $Cl_3$-phenyl ring | N | 3.91 | 3.53 | 193–195 [3] | 95.0 |
| ar,ar,ar-Trichlorobenzyl N-β-hydroxyethyl piperazinecarbodithioate<br>$CH_2S(S)CN\begin{matrix}CH_2-CH_2\\CH_2-CH_2\end{matrix}NCH_2CH_2OH$ on $Cl_3$-phenyl ring | N | 7.00 | 6.60 | 90–95 [2] | 66.3 |
| 2,3,5,6-Tetrachlorobenzyl diisopropyldithiocarbamate<br>$CH_2S(S)CN[CH(CH_3)_2]_2$ on 2,3,5,6-tetrachlorophenyl ring | S | 15.83 | 15.80 | 110–111 [2] | 79.0 |

Table IV—Continued

| Structural Formula | Analysis Calcd., percent | Analysis Found, percent | M.P., °C. | Yield, percent |
|---|---|---|---|---|
| 2,3,4,5-Tetrachlorobenzyl diisopropyldithiocarbamate<br>CH₂S(S)CN[CH(CH₃)₂]₂ 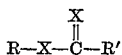 | N 3.46 | 2.87 | 82–83 [2] | 98.0 |
| ar,ar,ar-Trichlorobenzyl 5-ethyl-2-methyl-1-piperidenicarbodithioate 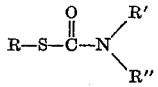 | N 3.5 | 3.0 | brown viscous oil | 88.0 |

[1] Recrystallized from ethyl alcohol.
[2] After recrystallizing from ethyl alcohol.
[3] After recrystallizing from ethyl acetate.

It is intended to cover all changes and modifications of the examples of the invention herein chosen for purposes of disclosure which do not constitute departures from the spirit and scope of the invention.

This application is a continuation-in-part of application Serial No. 470,836, filed November 23, 1954, now U.S. Patent No. 2,919,182, granted December 29, 1959.

What is claimed is:

1. The method of controlling undesired vegetation which comprises applying thereto a toxic concentration of a phytotoxic benzyl thiocarbamate possessing the structure $$R-X-\overset{X}{\underset{}{C}}-R'$$

where X is selected from a group consisting of oxygen and sulphur at least one of them being sulfur, and R represents a radical selected from the group consisting of benzyl, methyl substituted benzyl and halobenzyl containing not more than 4 halogen atoms and R' represents an amino radical selected from the group consisting of pyrrolidinyl, piperidinyl, 5-ethyl-2-methyl piperidinyl, morpholinyl, N-β-hydroxyethylpiperazinyl, NH₂ and disubstituted NH₂ wherein the substituents are selected from the group consisting of lower alkyl, lower alkoxy substituted lower alkyl, 2-carbamoyl ethyl, carboxy methyl, lower beta-monoolefinic, chloro substituted lower beta-monoolefinic and six-membered carbocyclic radicals with the proviso that not more than one is carbocyclic.

2. The method of controlling undesired vegetation which comprises applying thereto a toxic concentration of a halogen substituted benzyl dithiocarbamate possessing the structure $$R-S-\overset{S}{\underset{}{C}}-N\begin{subarray}{l}R'\\R''\end{subarray}$$

where R represents the halobenzyl radical and contains less than 5 halogen atoms, and R' and R'' represent lower alkyl radicals.

3. The method of controlling undesired vegetation which comprises applying thereto a toxic concentration of a halogen substituted benzyl dithiocarbamate possessing the structure $$R-S-\overset{S}{\underset{}{C}}-N\begin{subarray}{l}R'\\R''\end{subarray}$$

where R represents the halobenzyl radical containing at least 2 but less than 5 halogen atoms 2 of which are in the 2- and 6-positions, and R' and R'' represent lower alkyl.

4. The method of controlling undesired vegetation which comprises applying thereto a toxic concentration of a chlorobenzyl thiolcarbamate possessing the structure $$R-S-\overset{O}{\underset{}{C}}-N\begin{subarray}{l}R'\\R''\end{subarray}$$

where R represents the chlorobenzyl radical containing less than 5 chlorine atoms, and R' and R'' represent lower alkyl.

5. The method of controlling undesired vegetation which comprises applying thereto a toxic concentration of a chlorobenzyl dithiocarbamate containing less than 5 chlorine atoms in the benzyl radical, the valences on the nitrogen in the dithiocarbamic acid nucleus being satisfied by alkyl radicals containing 3 carbon atoms.

6. The method of controlling undesired vegetation which comprises applying thereto a toxic concentration of trichlorobenzyl diisopropyldithiocarbamate.

7. The method of controlling undesired vegetation which comprises applying thereto a toxic concentration of a 2,5-di-chloro substituted benzyl ester of a di(lower alkyl)dithiocarbamic acid.

8. The method of controlling undesired vegetation which comprises applying thereto a toxic concentration of 2,5-dichlorobenzyl di-alkyldithiocarbamate wherein each alkyl group contains at least two but not more than three carbon atoms.

9. The method of controlling undesired vegetation which comprises applying thereto a toxic concentration of a meta chloro substituted benzyl ester of a di(lower alkyl)dithiocarbamic acid.

10. The method of controlling undesired vegetation which comprises applying thereto a toxic concentration of m-chlorobenzyl diethyl-dithiocarbamate.

11. The method of controlling undesired vegetation which comprises applying thereto a toxic concentration of a 2,6-di-chloro substituted benzyl ester of a di(lower alkyl)dithiocarbamic acid.

12. The method of controlling undesired vegetation which comprises applying thereto a toxic concentration of 2,6-dichlorobenzyl di-alkyldithiocarbamate wherein each alkyl group contains at least two but not more than three carbon atoms.

13. The method of controlling undesired vegetation which comprises applying thereto a toxic concentration of 2,4,6-trichlorobenzyl dialkyldithiocarbamate where each alkyl group contains at least two but not more than three carbon atoms.

14. The method of controlling undesired vegetation which comprises applying thereto a toxic concentration of 2,3,6-trichlorobenzyl dialkyldithiocarbamate wherein each alkyl group contains at least two but not more than three carbon atoms.

15. The method of controlling undesired vegetation which comprises applying thereto a toxic concentration of 2,3,4-trichlorobenzyl dialkyldithiocarbamate wherein each alkyl group contains at least two but not more than three carbon atoms.

16. The method of controlling undesired vegetation which comprises applying thereto a toxic concentration of a chloro substituted benzyl ester of a di(lower alkyl)thiolcarbamic acid the number of chlorine atoms being at least one but less than five.

17. The method of controlling undesired vegetation which comprises applying to the soil medium before the plants to be destroyed emerge a toxic concentration of a polychlorobenzyl ester of a di(lower alkyl)thiolcarbamic acid in which the ester radical is composed of mixed isomers of polychlorobenzyl containing an average of 3 chlorine atoms.

18. The method of controlling undesired vegetation which comprises applying to the soil medium before the plants to be destroyed emerge a toxic concentration of a polychlorobenzyl ester of a di(lower alkyl)dithiocarbamic acid in which the ester radical is composed of mixed isomers of polychlorobenzyl containing an average of 3 chlorine atoms.

19. The method of claim 1 in which the toxicant is applied to the soil medium before the plants to be destroyed emerge.

20. The method of claim 2 in which the toxicant is applied to the soil medium before the plants to be destroyed emerge.

21. The method of claim 3 in which the toxicant is applied to the soil medium before the plants to be destroyed emerge.

22. The method of claim 4 in which the toxicant is applied to the soil medium before the plants to be destroyed emerge.

23. The method of claim 5 in which the toxicant is applied to the soil medium before the plants to be destroyed emerge.

24. The method of claim 6 in which the toxicant is applied to the soil medium before the plants to be destroyed emerge.

25. The method of controlling undesired vegetation which comprises applying to the soil medium before the plants to be destroyed emerge a toxic concentration of a compound possessing the structure

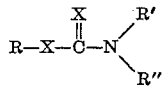

where R represents the benzyl radical, one X represents oxygen the other sulfur, R' and R" represent lower alkyl groups.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard | June 16, 1953 |
| 2,650,876 | Stewart | Sept. 1, 1953 |
| 2,687,348 | Kosmin | Aug. 24, 1954 |
| 2,710,259 | Blake et al. | June 7, 1955 |
| 2,723,989 | Harman | Nov. 15, 1955 |
| 2,744,898 | Harman et al. | May 8, 1956 |
| 2,776,196 | Gysin et al. | Jan. 1, 1957 |
| 2,776,197 | Gysin et al. | Jan. 1, 1957 |
| 2,812,247 | Gysin et al. | Nov. 5, 1957 |

FOREIGN PATENTS

| | | |
|---|---|---|
| 858,352 | Germany | Dec. 4, 1952 |

OTHER REFERENCES

Templeman et al.: "Nature," vol. 156, November 24, 1945, page 630.

Shaw et al.: "Weeds," January 1953, pages 43–65.

Szabo et al.: "Chemical Abstracts," vol. 51, 1957, col. 2217.